(12) United States Patent
Funk et al.

(10) Patent No.: US 9,593,974 B2
(45) Date of Patent: Mar. 14, 2017

(54) SYSTEM AND METHOD OF MONITORING OIL LEVEL IN TRANSMISSION SYSTEM OF MACHINE

(71) Applicant: Caterpillar Inc., Peoria, IL (US)

(72) Inventors: Ryan D. Funk, Washington, IL (US); Nathaniel P. O'Brien, Peoria, IL (US); Joseph R. Manley, East Peoria, IL (US); Dustin J. Funk, Dunlap, IL (US); Kendall R. Harrell, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 205 days.

(21) Appl. No.: 14/493,694

(22) Filed: Sep. 23, 2014

(65) Prior Publication Data

US 2016/0084695 A1   Mar. 24, 2016

(51) Int. Cl.
G01F 23/14      (2006.01)
G01F 23/00      (2006.01)

(52) U.S. Cl.
CPC .......... G01F 23/14 (2013.01); G01F 23/0076 (2013.01)

(58) Field of Classification Search
CPC ................................ G01F 23/14; G01F 23/246
See application file for complete search history.

(56) References Cited

U.S. PATENT DOCUMENTS

| 4,506,258 A * | 3/1985 | Charboneau .......... G01F 23/246 338/27 |
| 4,745,893 A | 5/1988 | Atherton et al. |
| 5,046,583 A * | 9/1991 | Sasaki ................... G01F 23/243 184/108 |
| 7,761,202 B2 * | 7/2010 | Nedorezov ........... G01F 23/247 701/103 |
| 2012/0041663 A1 * | 2/2012 | Suzuki ...................... E02F 9/26 701/102 |
| 2014/0288768 A1 * | 9/2014 | Fujiwara ................. E02F 9/226 701/33.4 |

FOREIGN PATENT DOCUMENTS

| EP | 1561916 | 12/2006 |
| JP | 2012184701 | 9/2012 |
| WO | 2013066529 | 5/2013 |

* cited by examiner

*Primary Examiner* — Francis Gray
(74) *Attorney, Agent, or Firm* — Jeff A. Greene (57) ABSTRACT

A method of monitoring oil level in a transmission system of a machine is disclosed. The method includes monitoring an oil pressure and calculating an average value of the oil pressure over a first predetermined time duration. The method further includes calculating a variance of the oil pressure from the average value and recording a deviation if the variance is beyond a threshold variance. The method further includes detecting a low oil level condition if a count of deviations is above a threshold count within a second predetermined time duration.

19 Claims, 4 Drawing Sheets

SYSTEM AND METHOD OF MONITORING OIL LEVEL IN TRANSMISSION SYSTEM OF MACHINE

TECHNICAL FIELD

The present disclosure relates to a transmission system for a machine, and more particularly to a system and a method of monitoring oil level in a transmission system of a machine.

BACKGROUND

Machines such as those used for, construction, agriculture, transportation and mining, may include a transmission system. The transmission system may be actuated by a hydraulic system associated therewith. The hydraulic system may include an oil tank or sump for containing oil therein. The oil may be supplied to the transmission system for actuating various components such as transmission clutches. The oil may also be used for lubricating various drive components of the transmission system. After a prolonged operation of the machine, quantity of the oil in the oil tank may decrease. As a level of oil in the oil tank reaches to a bottom thereof, an amount of oil may be insufficient for actuation of the transmission system and lubrication of the components. Eventually, performance of the transmission system may be affected and the drive components may undergo wear. Conventionally, saddle tanks, sump wet/dry switches, and low pressure switches may be used for protection against low oil level condition in the oil tank. Saddle tanks may require additional space within the transmission system and increase complexity. Further, the above solutions may not provide intended result if the machine is generally used for off-road applications. In off road applications, the ground surface may be uneven. Hence, when the machine is running over such uneven ground surfaces, the low pressure switch or the sump wet/dry switch may not give accurate result as the oil level may fluctuate based on orientation of the machine.

Japanese Patent Publication Number 2012/184701 discloses an oil level detection device for monitoring oil level in an engine based on a comparison of a normal pressure fluctuation waveform with a detected pressure fluctuation waveform. An internal pressure of oil in a crankcase is detected by a pressure sensor. The pressure sensor sends input corresponding to the internal pressure to a controller during operation of the engine. The controller compares the normal pressure fluctuation waveform with the detected pressure fluctuation waveform based on the internal pressure detected by the pressure sensor. If amplitude of the detected pressure fluctuation waveform exceeds a maximum amplitude threshold value or a wavelength of the detected pressure fluctuation waveform becomes smaller than the minimum wavelength threshold value, then abnormality in an oil level is determined A signal corresponding to such abnormality is communicated to an alarm. The alarm further lets an operator know the abnormality in the oil level.

SUMMARY OF THE DISCLOSURE

In one aspect of the present disclosure, a method of monitoring oil level in a transmission system of a machine is provided. The method includes monitoring an oil pressure and calculating an average value of the oil pressure over a first predetermined time duration. The method further includes calculating a variance of the oil pressure from the average value and recording a deviation if the variance is beyond a threshold variance. The method further includes detecting a low oil level condition if a count of deviations is above a threshold count within a second predetermined time duration.

In another aspect of the present disclosure, a system for monitoring oil level in a transmission system of a machine is provided. The system includes a sensor disposed in the transmission system. The sensor is configured to sense an oil pressure. The system further includes a controller communicably coupled to the sensor. The controller is configured to calculate an average value of the oil pressure over a first predetermined time duration. The controller is further configured to calculate a variance of the oil pressure from the average value and record a deviation if the variance is beyond a threshold variance. The controller is further configured to detect a low oil level condition if a count of deviations is above a threshold count within a second predetermined time duration.

In yet another aspect of the present disclosure, a machine is provided. The machine includes a power source and a transmission system drivably coupled to the power source. The machine further includes a sensor disposed in the transmission system. The sensor is configured to sense an oil pressure. The machine further includes a controller communicably coupled to the sensor. The controller is configured to calculate an average value of the oil pressure over a first predetermined time duration. The controller is further configured to calculate a variance of the oil pressure from the average value and record a deviation if the variance is beyond a threshold variance. The controller is further configured to detect a low oil level condition if a count of deviations is above a threshold count within a second predetermined time duration.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
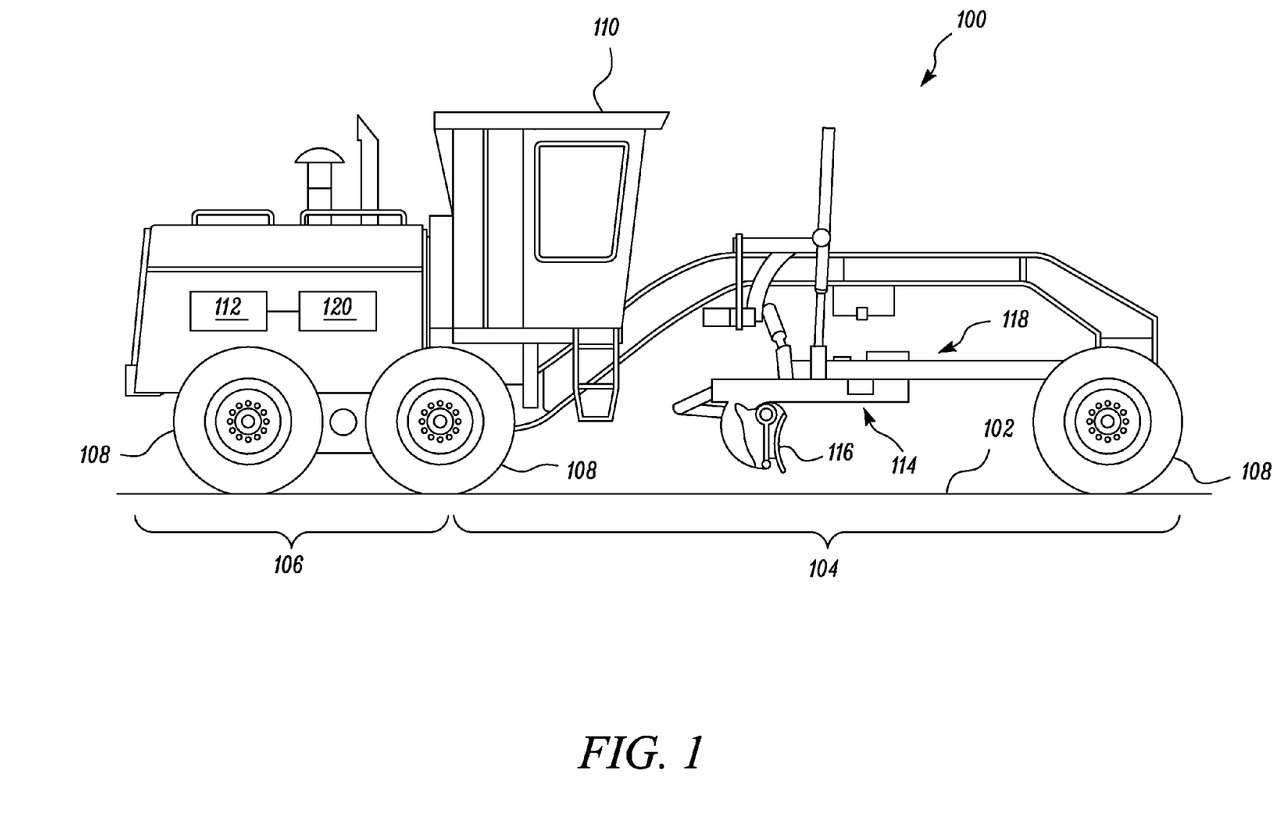
FIG. 1 is a side view of a machine, according to an embodiment of the present disclosure.

FIG. 1 shows a side view of an exemplary machine 100. The machine 100 may include an on-highway vehicle or an off-highway vehicle. Further, the machine 100 may include any machine that may be used for industries, such as construction, mining, quarrying, transportation or any other industry known in the art. In the embodiment of FIG. 1, the machine 100 is a motor grader. The motor grader may be used as a finishing tool to level a surface of a ground 102.

However, in other embodiments, the machine 100 may include a dozer, a loader, an excavator, a mining truck, and the like.

The machine 100 may include a front frame 104 and a rear frame 106 coupled with the front frame 104. The front frame 104 may be pivotally coupled with the rear frame 106 such that the front frame 104 may rotate relative to the rear frame 106. In an alternative embodiment, the machine 100 may include an integral frame (not shown). The front frame 104 and the rear frame 106 may be supported on ground engaging members 108. In an embodiment, the ground engaging member 108 coupled with the front frame 104 may include an axle having both ends coupled with wheels. Similarly, the ground engaging member 108 coupled with the rear frame 106 may include one or more axles having both ends coupled with wheels or tracks. The machine 100 may further include an operator cab 110 including various control operators, such as hand levers, pedals, buttons, switches, knobs and the like for operating the machine 100. The operator cab 110 may be mounted on the front frame 104.

The machine 100 may further include a power source 112 configured to provide power to various components including, but not limited to, the ground engaging members 108 and an implement system 114. In the illustrated embodiment, the power source 112 may be an engine. The power source 112 is hereinafter referred as 'the engine 112'. The engine 112 may be disposed in the rear frame 106, as shown schematically in FIG. 1. The engine 112 may run on a fuel, such as diesel or gasoline. The engine 112 may also be a dual fuel engine running on a liquid fuel and a gaseous fuel. The engine 112 may include a single cylinder or a plurality of cylinders. The plurality of cylinders may be in various configurations, such as inline, V-type, etc. The engine 112 may drive the ground engaging members 108 via a transmission system 120, shown schematically in FIG. 1.

The implement system 114 of the machine 100 may be operatively coupled to the front frame 104. Further, the implement system 114 may be configured to receive power from the engine 112 to actuate an implement 116 associated with the implement system 114. In the illustrated embodiment, the implement 116 may be a blade mounted on a linkage assembly 118 of the implement system 114. The linkage assembly 118 may be configured to move the implement 116 to various positions relative to the machine 100.

The transmission system 120 may be configured to transfer power from the engine 112 to the ground engaging members 108. The transmission system 120 may be configured to receive an output from the engine 112. In an embodiment, a torque converter (not shown) may be disposed between the engine 112 and the transmission system 120 to connect or disconnect power between the engine 112 and the transmission system 120. The transmission system 120 may be disposed in the rear frame 106 of the machine 100. Further, the transmission system 120 may be configured to manipulate the output received from the engine 112 to control speed and direction of the machine 100. In the illustrated embodiment, the transmission system 120 may be a direct drive power shift transmission. The transmission system 120 may include a shifting mechanism having a plurality of shifting clutches and a plurality of gear pairs for achieving different torque ratios between torque received from the engine 112 and torque supplied to the ground engaging members 108. In other embodiments, the transmission system 120 may be one of various types of transmissions, such as planetary power shift, countershaft power shift, hydrostatic or any other transmission known in the art.

Further, the transmission system 120 may be actuated by a mechanical system, a hydraulic system, an electrical system or a combination thereof. In an embodiment, a plurality of solenoid valves may be configured to hydraulically actuate the shifting clutches in order to obtain a desired torque ratio. The transmission system 120 may be selected according to the application of the machine 100. Thus, a desired combination of speed, direction and torque required for the application may be achieved.

Figure 2:
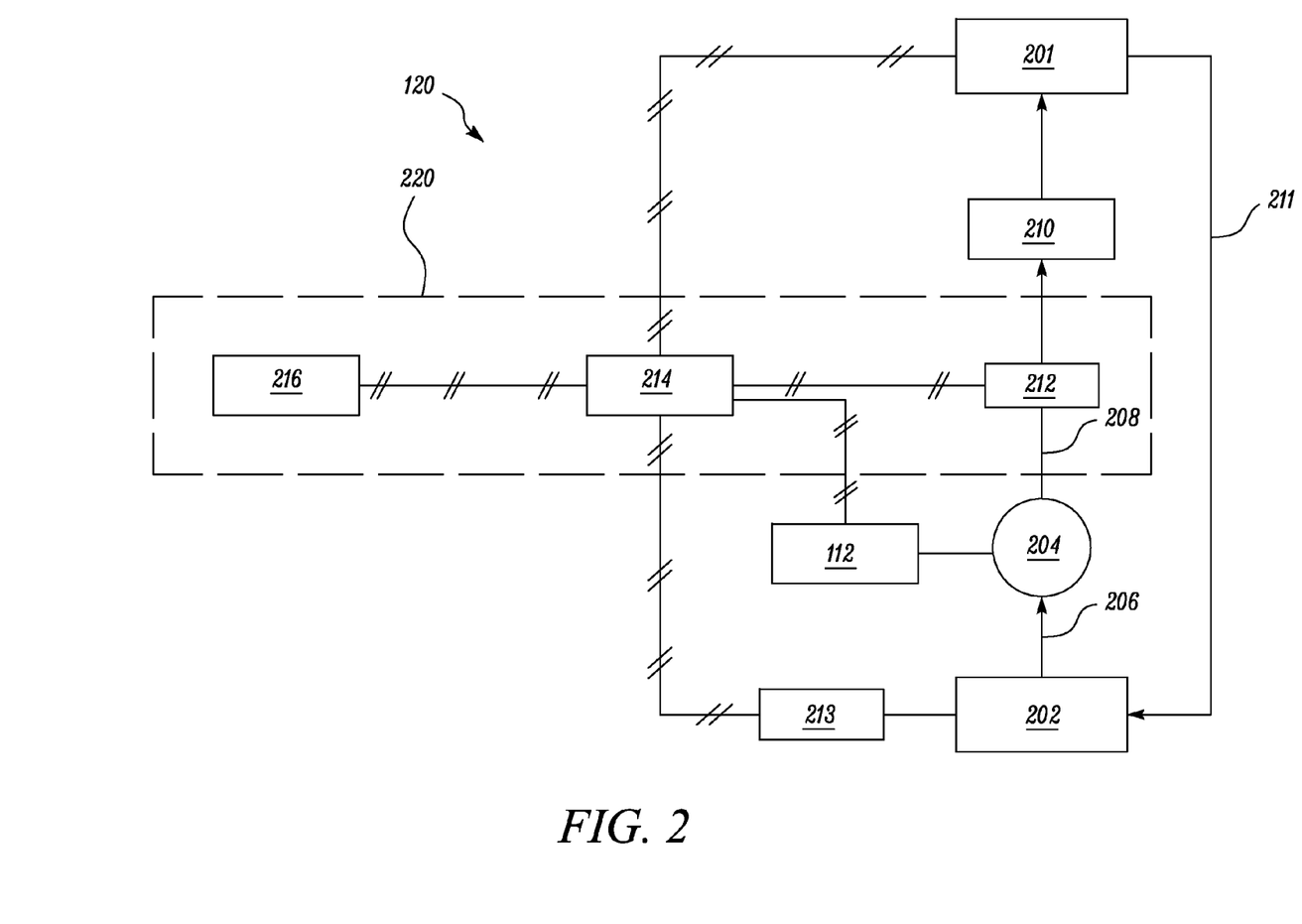
FIG. 2 is a block diagram of a transmission system incorporating a system for monitoring oil level in the transmission system, according to an embodiment of the present disclosure.

FIG. 2 illustrates a block diagram of the transmission system 120, according to an embodiment of the present disclosure. As illustrated in FIG. 2, the transmission system 120 may include a drive train 201. The drive train 201 may include various components, such as multiple gears, clutches, shafts and bearings for selectively transferring power from the engine 112 to the ground engaging members 108. Specifically, the drive train 201 may include the shifting mechanism for achieving the different torque ratios. The drive train 201 of the transmission system 120 may be lubricated to minimize wear of the components.

The transmission system 120 may further include a reservoir 202 for containing oil. The oil may be used for actuating the shifting mechanism of the drive train 201. Further, the oil may also be used for lubricating the drive train components. The oil may be any hydraulic fluid known in the art. The reservoir 202 may be provided at any location within a housing (not shown) of the transmission system 120. The reservoir 202 may be one of a sump and a tank. The housing may also be configured to enclose the drive train 201.

The transmission system 120 may further include a pump 204 configured to supply a pressurized oil to various components including, but not limited to, the torque converter and the shifting mechanism of the transmission system 120. In the illustrated embodiment, the pump 204 may be a fixed displacement pump. However, in other embodiments, the pump 204 may be a variable displacement pump. Further, the pump 204 may be a gear pump, a vane pump, a scroll pump, a reciprocating pump or any other pump known in the art. The pump 204 may be drivably coupled to the engine 112 to receive power therefrom. In other embodiments, the pump 204 may be coupled to the engine 112 via a gear drive, a chain drive, a belt drive, and the like.

The transmission system 120 may further include a suction line 206 configured to be in fluid communication between the pump 204 and the reservoir 202. An end of the suction line 206 communicates with the reservoir 202 may be positioned adjacent to a bottom surface of the reservoir 202 such that the suction line 206 remains in fluid communication with oil. During operation, the pump 204 may receive oil from the reservoir 202 via the suction line 206. The transmission system 120 may further include a pressure line 208 configured to discharge the pressurized oil from the pump 204 to the drive train 201. Specifically, the pressurized oil may be communicated to the torque converter and the shifting mechanism of the drive train 201. Further, the pressurized oil may also provide lubrication to the components of the drive train 201. In other embodiments, the pressurized oil may also be communicated with various other hydraulically actuated systems, such as steering system, brake system and the implement system 114 of the machine 100.

The transmission system 120 may further include a valve 210 disposed in the pressure line 208. The valve 210 may be fluidly disposed between the pump 204 and the drive train 201. The valve 210 may be configured to regulate a pressure of oil supplied to the drive train 201. Specifically, the valve 210 may be a pressure relief valve configured to allow flow of oil to the drive train 201 at a desired pressure. The desired pressure may correspond to a pressure that may be required to actuate the components of the drive train 201. The transmission system 120 may further include a return line 211 in fluid communication with the drive train 201 and the reservoir 202. The return line 211 may be configured to circulate oil back to the reservoir 202 from the drive train 201. In other embodiments, one or more filters (not shown) may also be disposed in the suction line 206 to filter oil.

As shown in FIG. 2, the transmission system 120 may include a system 220 configured to monitor oil level in the reservoir 202. The system 220 may be in communication with various components of the transmission system 120 to receive inputs therefrom in order to monitor oil level in the reservoir 202. The system 220 may include a sensor 212 disposed in the pressure line 208. The sensor 212 may be configured to be in fluid communication with the pressurized oil that may flow through the pressure line 208. The sensor 212 may be further configured to monitor a pressure of the pressurized oil. In the illustrated embodiment, the sensor 212 may be disposed in the pressure line 208 adjacent to an outlet of the pump 204. In other embodiments, the sensor 212 may be disposed at any location in the pressure line 208 between the pump 204 and the valve 210.

The system 220 may further include a controller 214 configured to be in communication with the sensor 212. The controller 214 may be configured to receive input signals from the sensor 212 corresponding to pressure of oil. The controller 214 may determine the oil pressure based on the input signal. In an embodiment, the controller 214 may determine the oil pressure at a sampling rate. In an example, the sampling rate may be about 50 Hertz. Thus, the controller 214 may determine the oil pressure 50 times every 1 second, i.e., once every 20 milliseconds. In an embodiment, the controller 214 may be a microprocessor based controller. The controller 214 may include one or more microprocessors to process various input signals received from various systems of the machine 100. The controller 214 may be configured to generate various outputs based on the input signals. The outputs of the controller 214 may be further communicated to an operator. Further, the controller 214 may be configured to automatically regulate the various systems of the machine 100 via the outputs. The controller 214 may include a memory configured to store various predetermined values, lookup tables and algorithms required to perform various functions.

In an embodiment, the system 220 may include a temperature sensor 213 configured to sense an oil temperature within the reservoir 202. The temperature sensor 213 may be disposed in the reservoir 202 to be in communication with the oil. However, in various other embodiments, the temperature sensor 213 may be disposed at any location of the transmission system 120 to sense the oil temperature. Further, the temperature sensor 213 may be in communication with the controller 214 to provide input signals corresponding to the sensed oil temperature. Upon receipt of the input signal, the controller 214 may calculate the oil temperature.

In an embodiment, the controller 214 may be configured to regulate a flow of oil from the valve 210 to the plurality of shifting clutches to obtain a desired torque and speed of the ground engaging members 108. Specifically, the controller 214 may regulate the multiple solenoid valves in order to actuate one or more shifting clutches. The controller 214 may selectively actuate the shifting clutches based on various inputs, for example, an operator input, a desired output speed and/or torque of the transmission system 120, a speed of the engine 112, and the like. Thus, the controller 214 may be configured to monitor a shift event status of the transmission system 120.

In an embodiment, the system 220 may include one or more sensors associated with the engine 112 for detecting an operational status of the engine 112. The operational status of the engine 112 may correspond to stable operating condition or transient operating condition of the engine 112. Transient operating condition may include operations such as startup, acceleration, deceleration, and the like. During transient operating condition, oil pressure within the transmission system 120 may oscillate irrespective of the oil level. Stable operating condition may correspond to operations of the engine 112 which may not cause oscillations in the oil pressure within the transmission system 120. The controller 214 may be in communication with one or more sensors associated with the engine 112. The sensors may be configured to monitor various operating parameters of the engine 112. The controller 214 may detect the operational status of the engine 112 based on signals received from the sensors. The controller 214 may further activate or retain the system 220 in active state if the operational status of the engine 112 corresponds to stable operating condition. Moreover, the controller 214 may deactivate the system 220 or retain the system 220 in inactive state if the operational status of the engine 112 corresponds to transient operating condition.

In an exemplary embodiment, the sensors may include a pressure sensor (not shown) and a speed sensor (not shown). The pressure sensor may be configured to sense an engine oil pressure and the speed sensor may be configured to sense a speed of the engine 112. In other embodiments, the pressure sensor and the speed sensor may be disposed at any location of the engine 112 to sense the engine oil pressure and the speed, respectively. Further, the pressure sensor and the speed sensor may be in communication with the controller 214 to send input signals corresponding to the engine oil pressure and the speed, respectively. Upon receipt of the input signals, the controller 214 may determine the engine oil pressure and the speed of the engine 112. Thus, the controller 214 may detect the operational status of the engine 112 based on the engine oil pressure and/or speed. However, it may be contemplated that the controller 214 may detect the operational status of the engine 112 based on any other operating parameters associated with the engine 112.

In other embodiments, the controller 214 may also be in communication with various systems of the machine 100, such as the braking system, the steering system, and the like.

The controller 214 may be further communicated with an external device 216. The external device 216 may be configured to alert an operator about a low oil level condition in the transmission system 120. The alert may be at least one of a visual alert, an audio alert and a tactile alert. In an embodiment, the external device 216 may be disposed on-board the machine 100. Specifically, the external device 216 may be disposed in the operator cab 110 of the machine 100. In such a case, the external device 216 may include a display device and/or an audio device to alert the operator about the low oil level condition in the transmission system 120. In another embodiment, the external device 216 may be disposed in a remote location relative to the machine 100. For example, the external device 216 may be located in a central office to enable a site supervisor to monitor the low oil level condition in the transmission system 120. The site supervisor may communicate with the operator of the machine 100 about the low oil level condition in the transmission system 120.

In further embodiment, the controller 214 may also be configured to regulate operation of the machine 100 in order to protect the machine 100 from damage due to the low oil level condition in the transmission system 120. Specifically, the controller 214 may control one or more components (e.g., the engine 112) of the machine 100 to safeguard the machine 100 against the low oil level condition.

The controller 214 may be further configured to calculate an average value of the oil pressure at the outlet of the pump 204 over a first predetermined time duration T1. In the illustrated embodiment, the average value of the oil pressure may be calculated based on a simple moving average method known in the art. The first predetermined time duration T1 may be greater than the sampling rate of the oil pressure. Further, the average value may be calculated based on a number of values of the oil pressure determined during the first predetermined time duration T1. The first predetermined time duration T1 may be defined as a time period for which the average value of the oil pressure may be calculated. Thus, the moving average value may be calculated for every elapsed first predetermined time duration T1. In an example, the first predetermined time duration T1 may be about 1000 milliseconds. Therefore, if the sampling rate is about 50 Hertz, the moving average value may be based on about 50 oil pressure values. In various other embodiments, the average value of the oil pressure may be calculated based on exponential moving average, cumulative moving average, weighted moving average, and the like known in the art.

The controller 214 may be further configured to calculate a variance of the oil pressure from the average value. The variance of the oil pressure may be a difference between a current oil pressure and the moving average value calculated for the first predetermined time duration T1 preceding the current time. For example, if the current oil pressure is determined at time T, the current oil pressure may be compared to the moving average value calculated from the time (T−T1). The current oil pressure may deviate from the moving average value based on various factors, such as an oil level within the reservoir 202, shift event status of the transmission system 120, engine operational status, and the like. In an embodiment, the controller 214 may use signal processing methods such as Fast Fourier transform to analyze the oil pressure data and determine amplitude and frequency of the variance of oil pressure.

Figure 4:
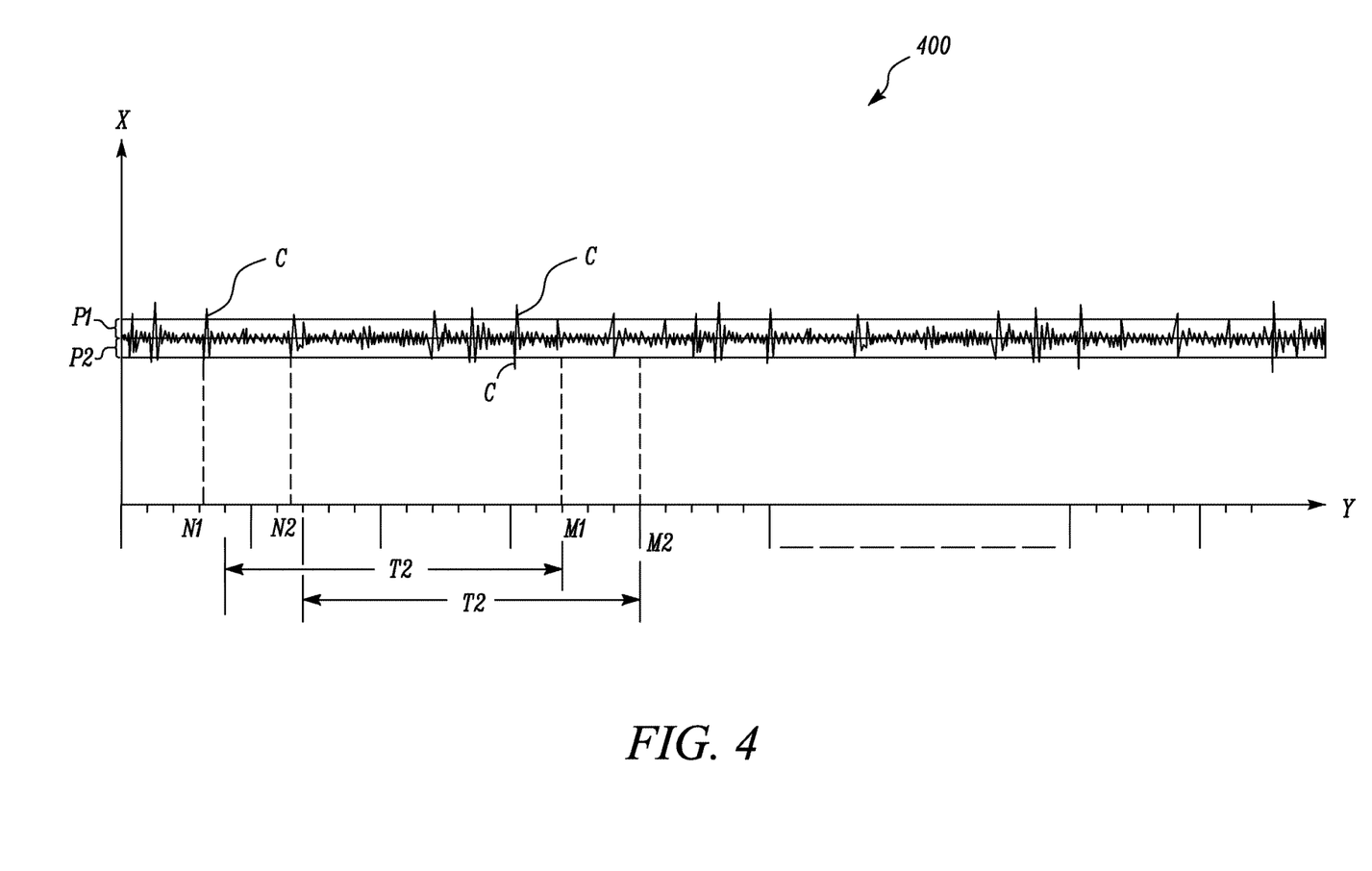
FIG. 4 shows an exemplary graphical representation of a variance of an oil pressure from an average of oil pressure.

The controller 214 may be configured to record a deviation if the variance is beyond a threshold variance. The threshold variance may be defined by an upper oil pressure limit P1 and a lower oil pressure limit P2 as shown in FIG. 4. The upper oil pressure limit P1 may correspond to a maximum acceptable increase of oil pressure from the moving average. Similarly, the lower oil pressure limit P2 may correspond to a maximum acceptable decrease of oil pressure from the moving average. Thus, the upper oil pressure limit P1 and the lower oil pressure limit P2 may define an acceptable variance from the moving average. The upper oil pressure limit P1 may be equal to the lower oil pressure limit P2. Alternatively, the upper oil pressure limit P1 and the lower oil pressure limit P2 may be different from each other.

An oil level in the reservoir 202 may decrease due to prolonged usage of the machine 100. As the oil level in the reservoir 202 moves towards the bottom surface of the reservoir 202, the pump 204 may receive oil from the reservoir 202 along with air. Further, vortices may be formed around the suction line 206 due to presence of air. In addition, the oil may contain air bubbles or entrained air. As a result, the pressure of oil supplied by the pump 204 may vary. The variations may be in the form of oscillations over time. As described above, the controller 214 may determine a variance of the current oil pressure from the average oil pressure. Due to oscillations in the oil pressure, one or more variances may be beyond the threshold variance. In the illustrated embodiment, the controller 214 may record a deviation if any one of the variances lies beyond the upper oil pressure limit P1 or the lower oil pressure limit P2.

The controller 214 may be further configured to store a time stamp of the deviation in a deviation array. The time stamp of the deviation may correspond to a time at which the deviation is recorded. The deviation array may be defined as an array of time stamps stored within a second predetermined time duration T2. The controller 214 may be further configured to erase the time stamps stored in the deviation array prior to the second predetermined time duration T2. Specifically, the controller 214 may erase time stamps recorded prior to the second predetermined time duration T2 with respect to a current time. In an example, as illustrated in FIG. 4, at a time M1, the time stamps stored in the deviation array prior to a time (M1−T2) may be erased.

In an embodiment, the second predetermined time duration T2 defined for counting the deviations may be equal to the first predetermined time duration T1 defined for calculating the average of the oil pressure. In another embodiment, the second predetermined time duration T2 may be greater than the first predetermined time duration T1. In yet another embodiment, the second predetermined time duration T2 may be less than the first predetermined time duration T1.

In an embodiment, the controller 214 may establish upper and lower oil pressure limits P1, P2 based on historical data of oil pressure variance. Historical data related to oil pressure may be stored in the memory associated with the controller 214. The controller 214 may dynamically change the upper and lower oil pressure limits P1, P2 based on the historical data. Thus, the threshold variance defined by the upper oil pressure limit P1 and the lower oil pressure limit P2 may also be dynamically changed.

In an embodiment, the controller 214 may also compare the oil temperature corresponding to the input signal with a threshold temperature of the oil. The threshold temperature of the oil may be defined as a minimum temperature of the oil acceptable for monitoring oil level condition. At or above the threshold temperature, various properties of oil, such as viscosity, density and the like, may have acceptable values required for monitoring the oil level condition. In an example, the threshold temperature of the oil may be about 60 Degree Celsius. If the oil temperature corresponding to the input signal is above the threshold temperature, then the controller 214 may record the time stamp of the deviations in the deviation array.

In an embodiment, the controller 214 may monitor the shift event status of the drive train 201. The controller 214 may determine an initiation of a shift event based on the actuation of the solenoid valves associated with the shifting clutches. Further, the controller 214 may determine duration of the shift event based on predetermined shift duration. The predetermined shift duration may depend on a time period taken by at least one of the plurality of clutches of the shifting mechanism to shift the drive train 201 from one gear pair to another gear pair to change the speed and torque of the machine 100. During the shift event, the oil pressure provided by the pump 204 may oscillate as the shifting clutches are actuated by oil. The predetermined shift duration may also depend on a time period required for the oil pressure to stabilize after the initiation of the shift event. The controller 214 may determine that the shift event is in process within the predetermined shift duration from the initiation of the shift event. Further, the controller 214 may record the deviation based on the shift event status. Specifically, the controller 214 may be configured to check if the shift event is in process while monitoring the oil level condition. The controller 214 may record the deviation if there is no shift event is in process at the time the deviation is detected.

In an embodiment, the controller 214 may compare the operational status of the engine 112 corresponding to input signals received from various sensors associated with the engine 112. In an example, the sensed parameters may be the engine oil pressure and the speed of the engine 112. Based on the input signals received from the speed sensor and the pressure sensor, the controller 214 may detect the operational status of the engine 112. The controller 214 may further activate or retain the system 220 in active state if the operational status of the engine 112 corresponds to stable operating condition. Moreover, the controller 214 may deactivate the system 220 or retain the system 220 in inactive state if the operational status of the engine 112 corresponds to transient operation condition. Thus, the controller 214 may record the deviation based on the operational status of the engine 112. In an example, the controller 214 may record the deviation if the operational status of the engine 112 corresponds to stable operating condition.

In the illustrated embodiment, the controller 214 may be further configured to record the deviation based on the operating conditions of the machine 100, as described above. The operating conditions may include variance lying beyond the threshold variance, temperature of oil above the threshold temperature, a shift event not in process and normal operation of the engine 112. The controller 214 may be configured to record the deviations only if all the operating conditions of the machine 100 are true. If any one or more of the operating conditions are false, the controller 214 may not record the time stamp of the deviations in the deviation array. In various other embodiments, operating conditions such as a braking event, movement of the machine 100 along a gradient, operation of the implement system 114 or any other operating conditions that may apply a load on the engine 112 may also be taken into consideration for recording the time stamp of deviations in the deviation array. The operating conditions of the machine 100 may also vary depend on the applications of the machine 100, such as mining, loading and grading, and environmental conditions.

The controller 214 may be further configured to detect a low oil level condition if the count of deviations is above a threshold count within the second predetermined time duration T2. The threshold count may be defined as maximum number of deviations acceptable in the second predetermined duration T2. In an embodiment, the threshold count may be empirically determined based on trials conducted on the machine 100 at predefined operating conditions. The predefined operating conditions of the machine 100 may include, but not limited to, speed of the engine 112, ground speed of the machine 100, the torque ratio of the drive train 201, and the like. If the count of deviations stored in the time stamp is above the threshold count for the second predetermined time duration T2, the controller 214 may send a signal to the external device 216. Upon receipt of the signal corresponding to the low oil level condition, the external device 216 may generate the alert to communicate with the operator. The controller 214 of the system 220 may also be configured to erase the stored time stamps prior to the second predetermined time duration T2.

INDUSTRIAL APPLICABILITY

Figure 3:
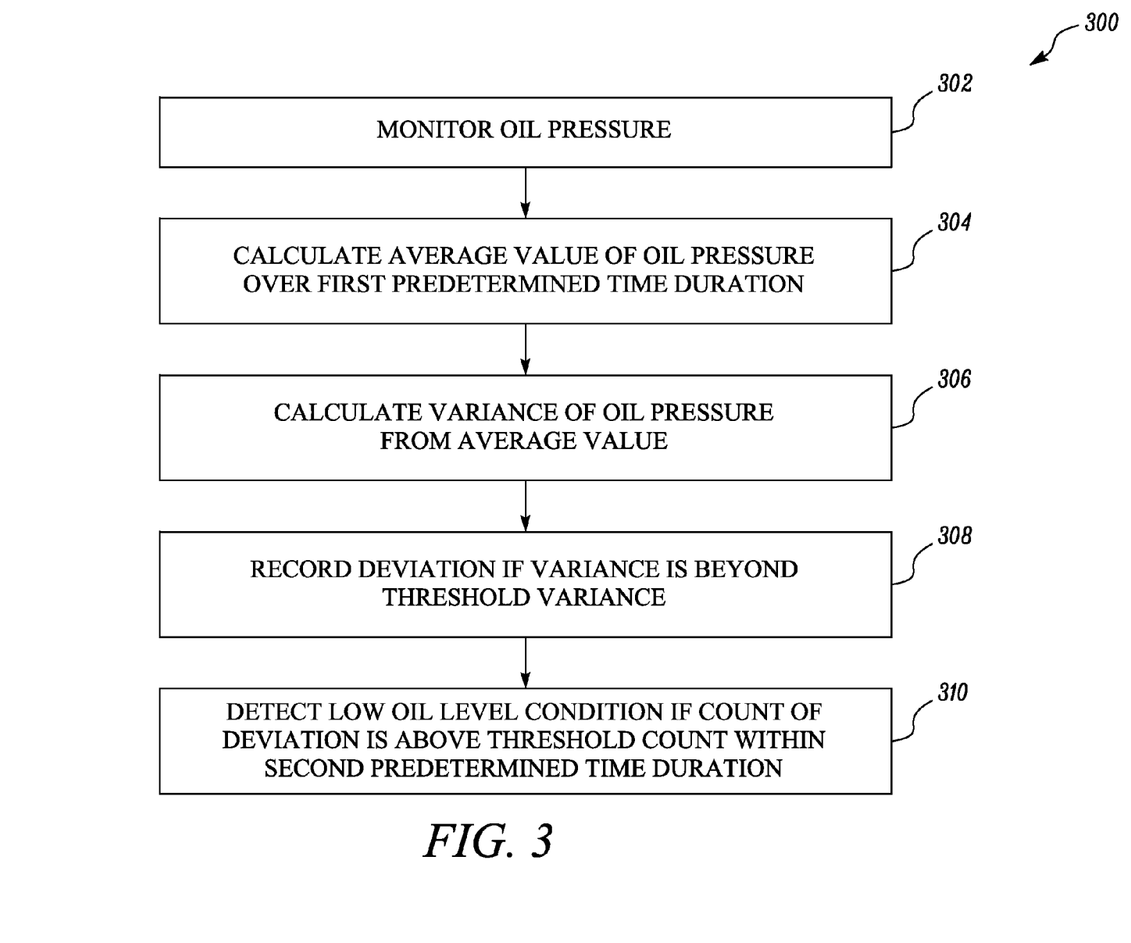
FIG. 3 illustrates a flowchart for a method of monitoring oil level in the transmission system, according to an embodiment of the present disclosure.

The present disclosure relates to the system 220 and a method 300 of monitoring oil level in the transmission system 120. The sensor 212 in communication with the pressure line 208 may monitor pressure of the oil supplied from the pump 204. The controller 214 in communication with the sensor 212 may detect the low oil level condition of the transmission system 120 based on the variance of the current oil pressure from the average oil pressure. Further, the controller 214 may generate the alert indicative of the low oil level condition of the transmission system 120.

FIG. 3 shows a flowchart for the method 300 of monitoring oil level in the transmission system 120, according to an embodiment of the present disclosure. The method 300 may be described in detail with respect to various steps and FIG. 4. FIG. 4 shows an exemplary graphical representation of the variance of the current oil pressure from the average oil pressure. The graphical representation may include an vertical axis representing oil pressure value and horizontal axis representing time duration. The graphical representation of the variance of the oil pressure may be hereinafter referred as 'output 400' for illustration of the present disclosure.

At step 302, the method 300 may include monitoring the oil pressure. When the engine 112 becomes functional, the pump 204 coupled with the engine 112 may be actuated to supply the pressurized oil through the pressure line 208. The sensor 212 in communication with the pressure line 208 may sense the pressure of the oil. Further, the sensor 212 may send input signal corresponding to the oil pressure to the controller 214. Upon receipt of the input signal, the controller 214 may determine the oil pressure at the sampling rate.

At step 304, the method 300 may include calculating the average value of the oil pressure over the first predetermined time duration T1. The average value may be calculated for every elapsed first predetermined time duration T1 to determine the moving average. The output 400 may also include moving average of the oil pressure plotted against time.

At step 306, the method 300 may include calculating the variance of the oil pressure from the average value of the oil pressure. The controller 214 may further determine the current pressure value based on the input signals received from the sensor 212. The current pressure value may be further compared with the moving average of the oil pressure to determine the variance of the oil pressure. The output 400 may also include the current oil pressure value plotted against time. The oil pressure at the outlet of the pump 204 may fluctuate based on various factors such as decrease in the oil level.

At step 308, the method 300 may include recording the deviation if the variance is beyond the threshold variance. Referring to FIG. 4, in the illustrated embodiment, the output 400 may include the upper oil pressure limit P1 and the lower oil pressure limit P2, thereby defining the acceptable variance from the moving average. The upper oil pressure limit P1 and the lower oil pressure limit P2 may be dynamically determined based on historical data of oil pressure. When oil level condition is normal in the reservoir 202, the oil may be supplied by the pump 204 with less variation in pressure. Hence, the variance of the current oil pressure from the average of the oil pressure may lie within the acceptable variance.

When the oil level moves towards the bottom surface of the reservoir 202, the pressure of oil supplied by the pump 204 may oscillate. In such case, one or more current oil pressure values may go beyond the threshold variance. Such variance may include increase of oil pressure or decrease of oil pressure beyond the upper oil pressure limit P1 and the lower oil pressure limit P2, respectively. Variances that lie beyond the threshold variance may be shown as C in FIG. 4.

In an embodiment, the method 300 may also include calculating the oil temperature. The controller 214 in communication with the temperature sensor 213 may receive input signal corresponding to the oil temperature. Further, the controller 214 may compare the oil temperature with the threshold temperature of the oil. If the oil temperature corresponding to the input signal is above the threshold temperature, the controller 214 may record the time stamp of the deviations in the deviation array.

In an embodiment, the method 300 may include monitoring the shift event status of the drive train 201. The controller 214 may further determine that the shift event is in process based on the predetermined shift duration and the initiation of the shift event. If there is no shift event in process while monitoring the oil level condition, then the controller 214 may record the time stamp of the deviations in the deviation array.

In an embodiment, the method 300 may include detecting the operational status of the engine 112. The controller 214 may compare various operational parameters of the engine 112 such as the engine oil pressure and the engine speed to detect operational status of the engine 112. If the operational status of the engine 112 corresponds to stable operating condition, then the controller 214 may record the time stamp of the deviation in the deviation array.

The controller 214 may be further configured to record the deviation based on the operating conditions of the machine 100, as described above. The operating conditions may include variance lying beyond the threshold variance, temperature of oil above the threshold temperature, a shift event not in process and normal operation of the engine 112. The controller 214 may be configured to record the deviations only if all the operating conditions of the machine 100 are true. If any one or more of the operating conditions are false, the controller 214 may not record the time stamp of the deviations in the deviation array. Referring to FIG. 4, in an example, the controller 214 may detect a deviation at time N1. Therefore, the controller 214 may store the time stamp N1 in the deviation array indicative of a single count of deviation. Similarly, the controller 214 may detect another deviation at time N2. Therefore, the controller 214 may store the time stamp N2 in the deviation array indicative of another count of deviation.

At step 310, the method 300 may include detecting the low oil level condition if the count of deviations is above the threshold count within the second predetermined time duration T2. During monitoring of the oil level condition in the transmission system 120, the controller 214 may count the number of deviations that may be stored as the time stamps in the deviation array. The controller 214 may further compare the count of deviations stored in the deviation array with the threshold count. If the count of deviations stored in the time stamp is above the threshold count for the second predetermined time duration T2, then the controller 214 may send signal to the external device 216. Upon receipt of the signal, the external device 216 may generate the alert to communicate with the operator. Thus, the operator of the machine 100 may receive a warning about the low oil level condition of the transmission system 120. The operator may then stop operating the machine 100 and perform requisite action to replace oil within the reservoir 202. In another embodiment, the controller 214 may alter the machine operation in a manner to protect the machine 100 from damage due to the low oil condition in the transmission system 120. Further, the method 300 may include generating a log event corresponding to the detected low oil level condition. The log event may be defined as set of information collected and stored after every alert corresponding to the low oil level condition in the transmission system 120. Further, the log event may be accessible during servicing of the machine 100 for diagnostic purposes.

In an embodiment, the method 300 may include erasing the time stamps of the deviations stored in the deviation array prior to the second predetermined time duration T2. For example, referring to FIG. 4, at the time M1, all the time stamps stored in the deviation array prior to the time (M1−T2) may be erased. Hence, the time stamp N1 may be erased from the deviation array. However, the time stamp N2 may be retained. Further, at a time M2, all the time stamps stored in the deviation array prior to the time (M2−T2) may be erased. Hence, the time stamp N2 may be erased from the deviation array.

Thus the system 220 and the method 300 may facilitate monitoring oil level in the reservoir 202 based on the pressure variation in the oil supplied by the pump 204. The system 220 and the method 300 does not rely solely on an absolute value of oil pressure or detected level of oil within the reservoir 202. The system 220 and the method 300 may detect a low oil level condition irrespective of an orientation of the machine 100 on uneven terrain. Further, the system 220 and the method 300 may consider various operational conditions of the machine 100 such as shift event, engine operational status, and oil temperature while determining the deviations. Such consideration of various operational conditions during oil level monitoring may avoid generation of any false alarm. In another embodiment, the controller 214 may use signal processing methods such as Fast Fourier transform to analyze the oil pressure data and determine amplitude and frequency of the variance of oil pressure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of monitoring oil level in a transmission system of a machine, the method comprising:
   monitoring an oil pressure;
   calculating an average value of the oil pressure over a first predetermined time duration;
   calculating a variance of the oil pressure from the average value;
   recording a deviation if the variance is beyond a threshold variance; and
   detecting a low oil level condition if a count of deviations is above a threshold count within a second predetermined time duration, wherein the first predetermined time duration is less than or greater than the second predetermined time duration.

2. The method of claim 1, further comprising:
calculating an oil temperature; and
recording the deviation if the oil temperature is above a threshold temperature.

3. The method of claim 1, further comprising:
monitoring a shift event status of the transmission; and
recording the deviation based on the shift event status.

4. The method of claim 1, further comprising:
detecting an operational status of a power source of the machine; and
recording the deviation based on the operational status.

5. The method of claim 1, further comprising storing a time stamp of the deviation in a deviation array.

6. The method of claim 5, further comprising erasing the time stamp of the deviation stored in the deviation array prior to the second predetermined time duration.

7. The method of claim 1, further comprising generating an alert indicative of the low oil level condition.

8. The method of claim 7, wherein the alert is at least one of a visual alert, an audio alert and a tactile alert.

9. The method of claim 1, further comprising generating a log event corresponding to the detected low oil level condition.

10. A system for monitoring oil level in a transmission system of a machine, the system comprising:
a sensor disposed in the transmission system, the sensor configured to sense an oil pressure; and
a controller communicably coupled to the sensor, the controller configured to:
calculate an average value of the oil pressure over a first predetermined time duration;
calculate a variance of the oil pressure from the average value;
record a deviation if the variance is beyond a threshold variance; and
detect a low oil level condition if a count of deviations is above a threshold count within a second predetermined time duration, wherein the first predetermined time duration is less than or greater than the second predetermined time duration.

11. The system of claim 10, the controller is further configured to:
calculate an oil temperature; and
record the deviation if the oil temperature is above a threshold temperature.

12. The system of claim 10, the controller is further configured to:
monitor a shift event status of the transmission; and
record the deviation based on the shift event status.

13. The system of claim 10, the controller is further configured to:
detect an operational status of a power source of the machine; and
record the deviation based on the operational status.

14. The system of claim 10, the controller is further configured to store a time stamp of the deviation in a deviation array.

15. The system of claim 14, the controller is further configured to erase the time stamp of the deviation stored in the deviation array prior to the second predetermined time duration.

16. A machine comprising:
a power source;
a transmission system drivably coupled to the power source;
a sensor disposed in the transmission system, the sensor configured to sense an oil pressure; and
a controller communicably coupled to the sensor, the controller configured to:
calculate an average value of the oil pressure over a first predetermined time duration;
calculate a variance of the oil pressure from the average value;
record a deviation if the variance is beyond a threshold variance; and
detect a low oil level condition if a count of deviations is above a threshold count within a second predetermined time duration, wherein the first predetermined time duration is less than or greater than the second predetermined time duration.

17. The machine of claim 16, the controller is further configured to:
calculate an oil temperature; and
record the deviation if the oil temperature is above a threshold temperature.

18. The machine of claim 16, the controller is further configured to:
monitor a shift event status of the transmission; and
record the deviation based on the shift event status.

19. The machine of claim 16, the controller is further configured to:
detect an operational status of a power source of the machine; and
record the deviation based on the operational status.

* * * * *